United States Patent
Jadhav et al.

(10) Patent No.: US 11,782,797 B2
(45) Date of Patent: *Oct. 10, 2023

(54) ACHIEVING ACTIVITY CENTRIC COMPUTING USING PORTABLE CONTAINERS

(71) Applicant: International Business Machines Corporation, Armonk, NY (US)

(72) Inventors: Nitin S. Jadhav, Pune (IN); Shailendra Moyal, Pune (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 91 days.

This patent is subject to a terminal disclaimer.

(21) Appl. No.: 17/345,611

(22) Filed: Jun. 11, 2021

(65) Prior Publication Data

US 2021/0303414 A1    Sep. 30, 2021

Related U.S. Application Data

(63) Continuation of application No. 16/149,804, filed on Oct. 2, 2018, now Pat. No. 11,119,864.

(51) Int. Cl.
*G06F 11/14* (2006.01)
*G06F 9/455* (2018.01)
*H04L 67/50* (2022.01)

(52) U.S. Cl.
CPC ...... *G06F 11/1464* (2013.01); *G06F 9/45558* (2013.01); *G06F 11/1451* (2013.01);
(Continued)

(58) Field of Classification Search
CPC ............ G06F 11/1464; G06F 11/1451; G06F 9/45558; G06F 2009/45562; G06F 2009/45591; H04L 67/22
See application file for complete search history.

(56) References Cited

U.S. PATENT DOCUMENTS 7,464,366 B2    12/2008 Shukla et al.
8,775,940 B2    7/2014 Beringer et al.
(Continued)

OTHER PUBLICATIONS

List of IBM Patents or Patent Applications Treated as Related, Jun. 23, 2021, pp. 1-2.

*Primary Examiner* — Prasith Thammavong
(74) *Attorney, Agent, or Firm* — SHACKELFORD, BOWEN, MCKINLEY & NORTON, LLP; Robert A. Voigt, Jr.

(57) ABSTRACT

A method, system and computer program product for achieving activity centric computing. An activity (e.g., opening an application, opening an electronic communication, initiating a printing action, initiating a browsing session) performed by a user on a computing device is detected. In response to detecting the activity, the runtime environment is captured and the session workflow associated with the detected activity is recorded. The session workflow refers to the events performed by the user on the computing device in connection with performing an activity (e.g., application usage, web browsing) on the computing device. The captured runtime environment and the recorded session workflow associated with the detected activity are stored in a portable container. After receiving an indication to share the activity, an image of the container is created and stored in a repository to be shared among users to replay the session workflow associated with the activity.

20 Claims, 5 Drawing Sheets

(52) U.S. Cl.
CPC .. *H04L 67/535* (2022.05); *G06F 2009/45562* (2013.01); *G06F 2009/45591* (2013.01)

(56) References Cited

U.S. PATENT DOCUMENTS

| | | | |
|---|---|---|---|
| 9,696,971 B1* | 7/2017 | Wierda | G06F 8/36 |
| 10,146,629 B1* | 12/2018 | Yadav | G06F 11/1461 |
| 2007/0266368 A1 | 11/2007 | Szpak et al. | |
| 2007/0299713 A1 | 12/2007 | Macbeth et al. | |
| 2011/0099147 A1 | 4/2011 | McAlister et al. | |
| 2014/0279919 A1 | 9/2014 | Sygulla et al. | |
| 2015/0347430 A1 | 12/2015 | Ghosh et al. | |
| 2016/0085645 A1 | 3/2016 | Buzzard et al. | |
| 2017/0031769 A1* | 2/2017 | Zheng | G06F 3/0683 |
| 2017/0315728 A1 | 11/2017 | Zheng et al. | |
| 2018/0006902 A1* | 1/2018 | Bansal | G06F 11/3457 |
| 2018/0032410 A1* | 2/2018 | Kang | G06F 11/1438 |
| 2019/0163763 A1 | 5/2019 | Pandey et al. | |
| 2019/0220367 A1 | 7/2019 | Kashi Visvanathan et al. | |

\* cited by examiner

ACHIEVING ACTIVITY CENTRIC COMPUTING USING PORTABLE CONTAINERS

TECHNICAL FIELD

The present invention relates generally to activity centric computing, and more particularly to achieving activity central computing using portable containers.

BACKGROUND

Activity centric computing, sometimes referred to as activity based computing, is a computing paradigm in which human activities, as opposed to applications or documents, become the central focus. For example, in activity centric computing, context switching occurs between activities (e.g., web browsing, electronic communication) as opposed to between processes or threads.

In recent years, there has been an effort to achieve activity centric computing with minimal success, in part, because of the design of current operating systems. Current operating systems are designed around software system entities, such as windows, files, processes, etc. which makes it difficult to implement an activity centric computing environment.

As a result, there is not currently a means for implementing a successful activity centric computing environment.

SUMMARY

In one embodiment of the present invention, a computer-implemented method for achieving activity centric computing comprises detecting an activity performed by a user on a computing device. The method further comprises capturing a runtime environment and recording a session workflow associated with the detected activity in response to detecting the activity performed by the user on the computing device, where the session workflow comprises a flow of events performed by the user on the computing device. The method additionally comprises storing the captured runtime environment and the recorded session workflow associated with the detected activity in a container. Furthermore, the method comprises creating an image of the container. Additionally, the method comprises saving the container image in a repository to be shared among users.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for achieving activity centric computing. In one embodiment of the present invention, an activity (e.g., opening an application, opening an electronic communication, initiating a printing action, initiating a browsing session) performed by a user on a computing device is detected. In response to detecting the activity, the runtime environment is captured and the session workflow associated with the detected activity is recorded. The captured runtime environment includes the application operating runtime with the required application components. Furthermore, the session workflow refers to the events performed by the user on the computing device in connection with performing an activity (e.g., application usage, web browsing, printing, electronic communication) on the computing device. The captured runtime environment and the recorded session workflow associated with the detected activity are stored in a portable container. A portable container is a lightweight, standalone, executable package of software that includes everything needed to run an application: code, operating runtime, system tools, system libraries and settings. Furthermore, the portable container packages code and dependencies together. As a result, the portable container contains the application components, operating runtime, checkpoints (the session workflow is marked by multiple checkpoints set by the user during the session) and the recorded session workflow. After receiving an indication to share the activity, an image of the container is created. An "image," as used herein, refers to an exact copy of the portable container. The portable container image is then stored in a repository to be shared among users, including different users (i.e., different users from the user whose activity was recorded). By saving the portable container image in the repository, the portable container image can be checked out by users to replay the session workflow associated with the activity. In this manner, a successful activity centric computing environment is achieved by allowing context switching to occur between activities.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
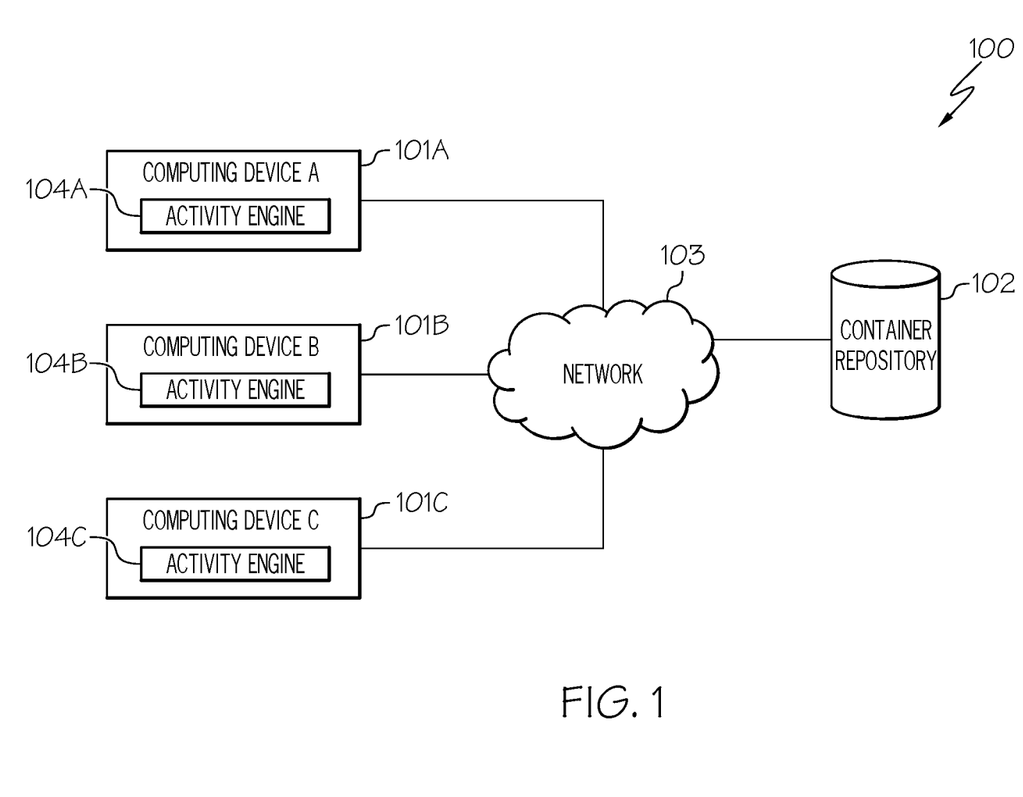
FIG. 1 illustrates a communication system for practicing the principles of the present invention in accordance with an embodiment of the present invention.

Referring now to the Figures in detail, FIG. 1 illustrates an embodiment of the present invention of a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) connected to a container repository 102 via a network 103. Computing devices 101A-101C may collectively or individually be referred to as computing devices 101 or computing device 101, respectively. It is noted that both computing devices 101 and the users of computing devices 101 may be identified with element number 101.

Computing devices 101 may each have the functionality of achieving activity centric computing utilizing containers, referred to herein as "portable containers." Such containers are lightweight containers (e.g., Docker® containers) that share the computing device's operating system kernel and therefore do not require an operating system per application. Furthermore, as discussed in further detail below, such containers store a captured runtime environment as well as a recorded session workflow associated with a detected activity. An image of these containers may be stored in container repository 102 by a user of computing device 101 (e.g., computing device 101A) to be shared among other users, such as users of computing devices 101B, 101C.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and repository 102. A description of the hardware configuration of computing device 101 is provided below in connection with FIG. 2.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

In communication system 100, computing devices 101A-101C include a software component, referred to herein as the activity engine 104A-104C, respectively. Activity engines 104A-104C may collectively or individually be referred to as activity engines 104 or activity engine 104, respectively. As discussed in further detail below, activity engine 104 enables activity centric computing on computing device 101.

System 100 is not to be limited in scope to any one particular network architecture. System 100 may include any number of computing devices 101, repositories 102 and networks 103.

Figure 2:
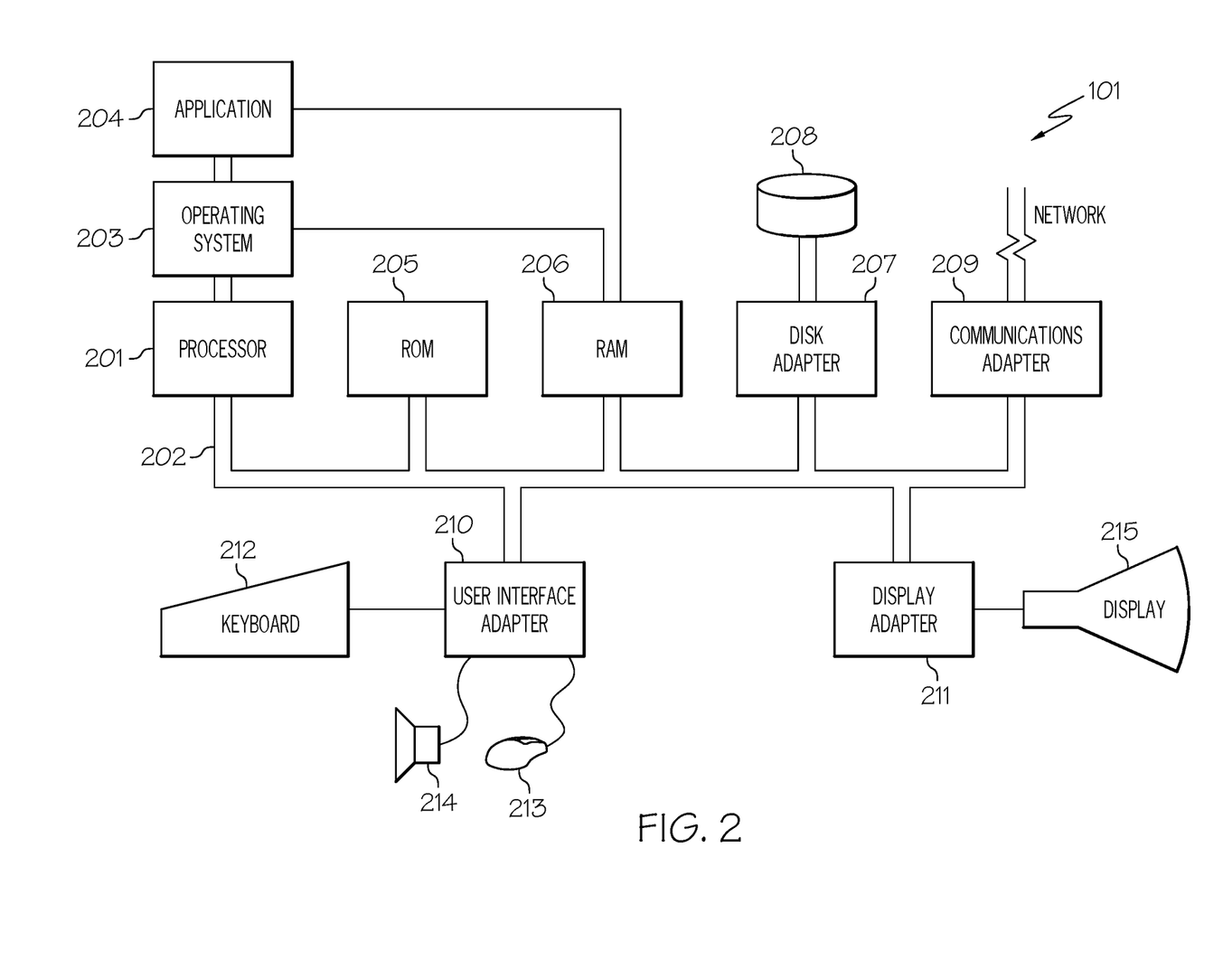
FIG. 2 illustrates an embodiment of the present invention of a hardware configuration of a computing device which is representative of a hardware environment for practicing the present invention.

Referring now to FIG. 2, FIG. 2 illustrates a hardware configuration of computing device 101 (FIG. 1) which is representative of a hardware environment for practicing the present invention. Referring to FIG. 2, computing device 101 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program, such as activity engine 104, for achieving activity centric computing as discussed further below in connection with FIGS. 3-6.

Referring again to FIG. 2, read-only memory ("ROM") 205 is coupled to system bus 202 and includes a basic input/output system ("BIOS") that controls certain basic functions of computing device 101. Random access memory ("RAM") 206 and disk adapter 207 are also coupled to system bus 202. It should be noted that software components including operating system 203 and application 204 may be loaded into RAM 206, which may be computing device's 101 main memory for execution. Disk adapter 207 may be an integrated drive electronics ("IDE") adapter that communicates with a disk unit 208, e.g., disk drive.

Computing device 101 may further include a communications adapter 209 coupled to bus 202. Communications adapter 209 interconnects bus 202 with an outside network (e.g., network 103 of FIG. 1) thereby enabling computing device 101 to communicate with other devices (e.g., computing devices 101 and repository 102 of FIG. 1).

I/O devices may also be connected to computing device 101 via a user interface adapter 210 and a display adapter 211. Keyboard 212, mouse 213 and speaker 214 may all be interconnected to bus 202 through user interface adapter 210. A display monitor 215 may be connected to system bus 202 by display adapter 211. In this manner, a user is capable of inputting to computing device 101 through keyboard 212 or mouse 213 and receiving output from computing device 101 via display 215 or speaker 214. Other input mechanisms may be used to input data to computing device 101 that are not shown in FIG. 2, such as display 215 having touch-screen capability and keyboard 212 being a virtual keyboard. Computing device 101 of FIG. 2 is not to be limited in scope to the elements depicted in FIG. 2 and may include fewer or additional elements than depicted in FIG. 2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, activity centric computing, sometimes referred to as activity based computing, is a computing paradigm in which human activities, as opposed to applications or documents, become the central focus. For example, in activity centric computing, context switching occurs between activities (e.g., web browsing, electronic communication) as opposed to between processes or threads. In recent years, there has been an effort to achieve activity centric computing with minimal success, in part, because of the design of current operating systems. Current operating systems are designed around software system entities, such as windows, files, processes, etc. which makes it difficult to implement an activity centric computing environment. As a result, there is not currently a means for implementing a successful activity centric computing environment.

Figure 3:
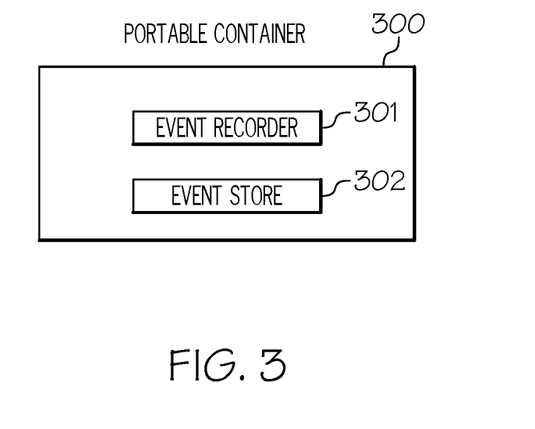
FIG. 3 illustrates the software components of the portable container in accordance with an embodiment of the present invention.
Figure 4:
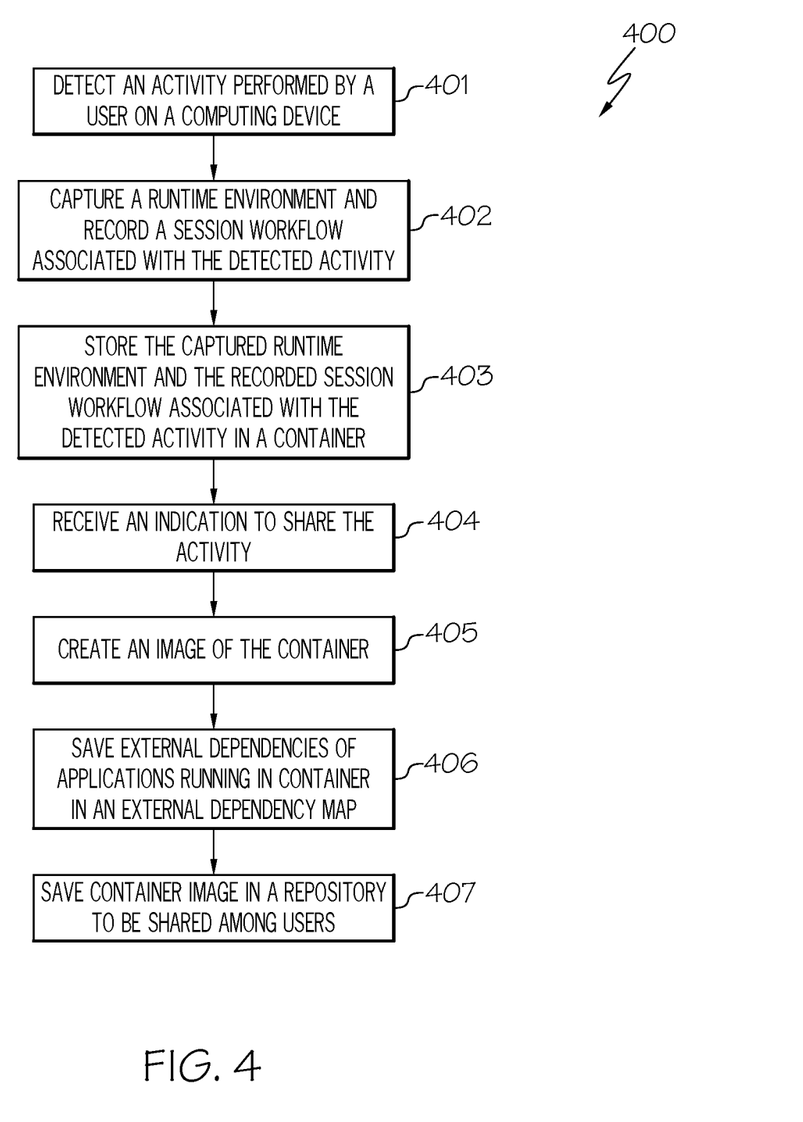
FIG. 4 is a flowchart of a method for achieving activity centric computing in accordance with an embodiment of the present invention.
Figure 5:
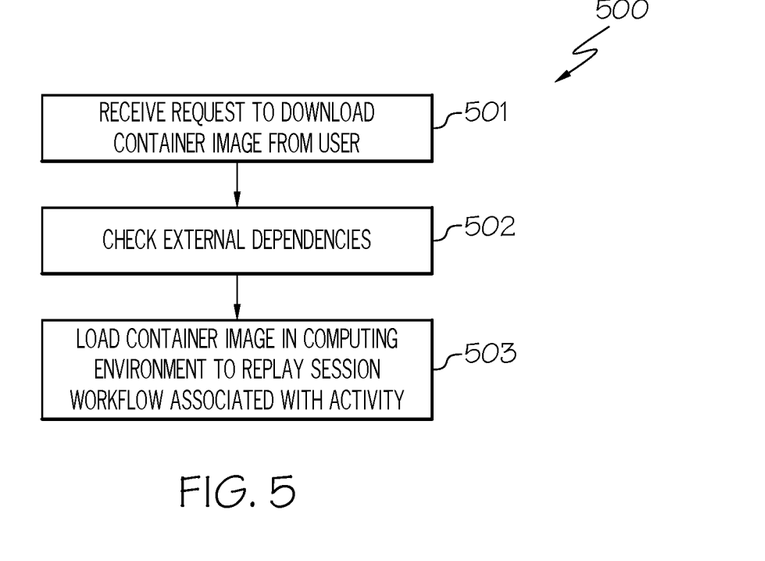
FIG. 5 is a flowchart of a method for sharing the activity context stored within the portable container image in accordance with an embodiment of the present invention.
Figure 6:
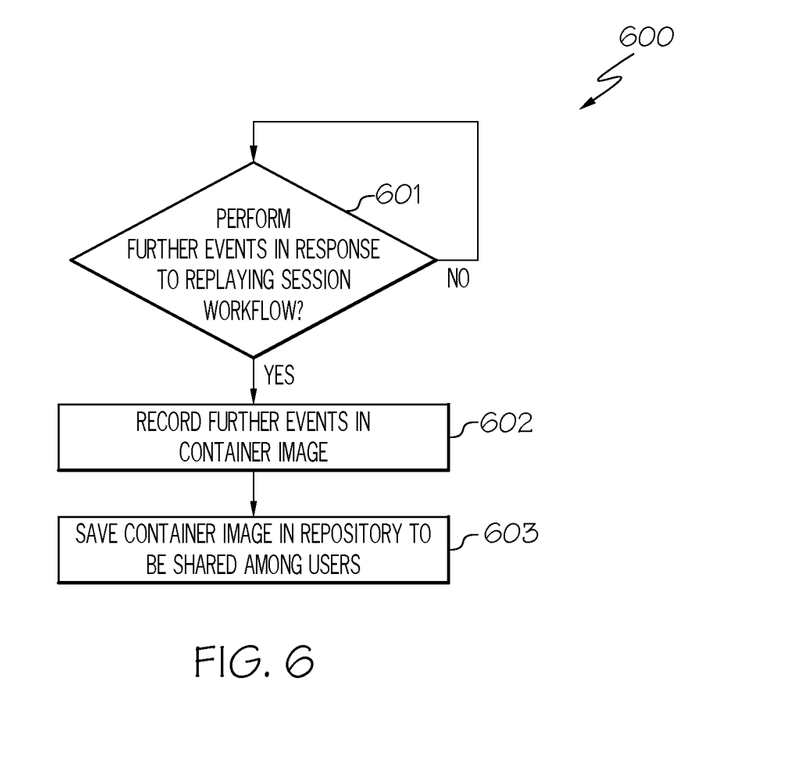
FIG. 6 is a flowchart of a method for appending events to the session workflow from new interactions in accordance with an embodiment of the present invention.

The embodiments of the present invention provide a means for implementing a successful activity centric computing environment via the use of portable containers as discussed further below in connection with FIGS. 3-6. FIG. 3 illustrates the software components of the portable container. FIG. 4 is a flowchart of a method for achieving activity centric computing. FIG. 5 is a flowchart of a method for sharing the activity context stored within the portable container image. FIG. 6 is a flowchart of a method for appending events to the session workflow from new interactions.

As stated above, FIG. 3 illustrates the software components of a portable container 300 in accordance with an embodiment of the present invention.

Referring to FIG. 3, in one embodiment, portable container 300 (e.g., Docker® container) is a lightweight, stand-alone, executable package of software that includes everything needed to run an application: code, operating runtime, system tools, system libraries and settings. Portable container 300 packages code and dependencies (when a piece of software relies on another one) together. Furthermore, as discussed further below, portable container 300 includes a captured runtime environment and a recorded session workflow associated with a detected activity. The captured runtime environment includes the application operating runtime with the required application components. The session workflow, as used herein, refers to the events performed by the user on computing device 101 in connection with performing an activity (e.g., application usage, web browsing, printing, electronic communication) on computing device 101. The activity can then be executed on any computing device 101 since the activity is executed on the underlying operating runtime container (containerized operating system). That is, the session workflow can be executed on any operating system in a container image (discussed further below) that contains the application components, operating runtime (execution environment provided to the process by the operating system), checkpoints (discussed further below) and the recorded session workflow.

In one embodiment, portable container 300 resides in the user space of the virtual memory. A conventional operating system 203 (FIG. 2) usually segregates the virtual memory into user space and kernel space. User space is the memory area where all user mode applications work; whereas, kernel space is strictly reserved for running the kernel, kernel extensions, and most device drivers.

As shown in FIG. 3, portable container 300 includes an event recorder 301. Event recorder 301 is configured to record the session workflow associated with an activity detected by activity engine 104. As discussed above, the session workflow refers to the events performed by the user on computing device 101 in connection with performing an activity (e.g., application usage, web browsing, printing, electronic communication) on computing device 101. Such events are tracked and recorded by event recorder 301. In one embodiment, the session workflow is marked by multiple checkpoints set by user 101 during the session. In one embodiment, these multiple checkpoints are progressively set by user 101 during the session. In one embodiment, these checkpoints establish intervals of recorded time requiring the user's consent to record such intervals.

Portable container 300 further includes an event store 302 configure to store the recorded session workflow. That is, the recorded flow of events is stored in event store 302. In one embodiment, event store 302 further stores the captured runtime environment, including the application operating runtime with the required application components. Hence, in one embodiment, event store 302 stores the application components, the operating runtime, the checkpoints and the recorded workflow, all of which are used to replay the recorded activity.

Such recorded flow of events can be replayed by the same (referring to the user whose events were recorded) or a different user 101 using portable container 300 as discussed below in connection with FIG. 4.

FIG. 4 is a flowchart of a method 400 for achieving activity centric computing in accordance with an embodiment of the present invention.

Referring to FIG. 4, in conjunction with FIGS. 1-3, in step 401, activity engine 104 detects an activity performed by a user on computing device 101. In one embodiment, such detection may occur in response to detecting an action associated the activity (e.g., opening an application, opening an electronic communication, initiating a printing action, initiating a browsing session). In one embodiment, the actions associated with the activity may be stored in a data structure stored in a storage unit of computing system 101 (e.g., memory 205, disk unit 208). In one embodiment, the activities to be detected by activity engine 104 may be defined by user 101. In one embodiment, such activities may be user specified at the time of initiating the activity (e.g., web browsing). For example, user 101 may inform activity engine 104 to capture the session workflow, such as at the beginning of the user starting this activity (e.g., web browsing).

In step 402, in response to detecting an activity performed by a user on computing device 101, activity engine 104 captures a runtime environment and records a session workflow associated with the detected activity. As discussed above, the captured runtime environment includes the application operating runtime with the required application components. Furthermore, as discussed above, the session workflow refers to the events performed by the user on computing device 101 in connection with performing an activity (e.g., application usage, web browsing, printing, electronic communication) on computing device 101. In one embodiment, the session workflow is recorded by event recorder 301 and later stored in event store 302. As discussed above, the session workflow may be marked by multiple checkpoints (progressively) set by user 101 during the session. These checkpoints may establish intervals of recorded time requiring the user's consent to record such intervals. By capturing the runtime environment and recording the session workflow associated with the detected activity, the context of the activity, including events performed by the user across different application instances, can be recorded within a single activity container.

In step 403, activity engine 104 stores the captured runtime environment and the recorded session workflow associated with the detected activity in portable container 300, such as in event store 302. As discussed above, portable container 300 is a lightweight, standalone, executable package of software that includes everything needed to run an application: code, operating runtime, system tools, system libraries and settings. Furthermore, portable container 300 packages code and dependencies together. As a result, portable container 300 contains the application components, operating runtime, checkpoints and the recorded session workflow.

In step 404, activity engine 104 receives an indication to share the detected activity. In one embodiment, activity engine 104 receives such an indication from the user of computing device 101 whose activity was detected in step 401. For example, the user may indicate via a user interface of computing device 101 for activity engine 104 to share the detected activity, whether with the user or a different user.

In step 405, activity engine 104, in response to receiving an indication to share the detected activity, creates an image of portable container 300. An "image," as used herein, refers to an exact copy of portable container 300.

In step 406, activity engine 104 saves the external dependencies of applications running in portable container 300 in an external dependency map, which may be stored in repository 102 along with the container image (discussed below). In one embodiment, the external dependencies of the applications running in portable container 300 are saved in the external dependency map when the image of portable container 300 is created. As discussed further below, the external dependencies are checked before loading a saved container image in a computing environment. These dependencies are necessary to ensure applications run properly as some of the code may rely on other pieces of code, and such pieces of code need to be known.

In step 407, activity engine 104 saves the portable container image in repository 102 to be shared among users, including different users (i.e., different users from the user whose activity was recorded). By saving the portable container image in repository 102, the portable container image can be checked out by users of computing devices 101. In this manner, a successful activity centric computing environment is achieved by allowing context switching to occur between activities. In one embodiment, the user who shares the activity can set read/write access for users or groups.

The activity context stored within the portable container image can be shared as discussed below in FIG. 5.

FIG. 5 is a flowchart of a method 500 for sharing the activity context stored within the portable container image in accordance with an embodiment of the present invention.

Referring to FIG. 5, in conjunction with FIGS. 1-4, in step 501, activity engine 104 receives a request to download a container image from user 101. In one embodiment, the user may indicate such a request via a user interface of computing device 101.

In step 502, activity engine 104 checks the external dependencies before loading a saved container image in a computing environment to ensure that the applications in the portable container image run properly. As discussed above, these dependencies are necessary to ensure applications run properly as some of the code may rely on other pieces of code, and such pieces of code need to be known.

In step 503, activity engine 104 loads the container image in the computing environment of computing device 101 (computing device of the requesting user) to replay the session workflow associated with the activity. In this manner, the present invention achieves activity centric computing by allowing context switching to occur between activities.

In one embodiment, the user may be the same or different user whose activity was recorded. In the situation of where a user (e.g., user of computing device 101B) replays the session workflow associated with an activity of another user (e.g., user of computing device 101A), the user (e.g., user of computing device 101B) may be able to replay the events associated with the activity without any previous knowledge of the sequence of the activity and obtain a quick grasp of the context of the activity.

In one embodiment, the user of computing device 101 may choose to view the entire session workflow or jump across the checkpoints to obtain a quick view of the session workflow. In one embodiment, the shared activity can be loaded and resumed from where it had been stopped, such as in the situation when the user requests to replay the session workflow of its own recorded activity.

For example, a user, such as a developer, may want to capture the workflow that occurs when the user is debugging some legacy code to identify the source of a failure. At times, the debugging requires multiple sessions of debugging to attempt to identify the root cause of the failure. As a result, the user can start the debugging process by marking the start of an active session thereby replaying the session workflow at that point.

After replaying the session workflow, the user may append events to the session workflow from new interactions, where the updated session workflow is stored in the portable container image (event store 302), which is stored in repository 102 to be shared among users 101 as discussed below in connection with FIG. 6.

FIG. 6 is a flowchart of a method 600 for appending events to the session workflow from new interactions in accordance with an embodiment of the present invention.

Referring to FIG. 6, in conjunction with FIGS. 1-5, in step 601, activity engine 104 determines whether user 101 performs any further events in response to replaying the session workflow.

If user 101 does not perform any further activity, then activity engine 104 continues to determine whether user 101 performs any further events in response to replaying the session workflow in step 601.

If, however, user 101 performs further events, then, in step 602, activity engine 104 records those events in the portable container image. That is, activity engine 104 appends the new events from the new interactions to the session workflow saved in the portable container image.

In step 603, activity engine 104 saves the portable container image with the newly recorded interactions in repository 102 to be shared among users 101, including other users.

As discussed above, embodiments of the present invention implement a successful activity centric computing environment via the use of a portable container that contains the application components, operating runtime, checkpoints and a recorded workflow session associated with an activity performed by the user on the computing device. The portable container is a lightweight, standalone, executable package of software that includes everything needed to run an application: code, operating runtime, system tools, system libraries and settings. An image of the portable container is created and stored in a repository to enable the sharing of the activity among users.

Furthermore, embodiments of the present invention improve the functionality or capability of computing systems by enabling context switching between activities as opposed to between processes or threads. Users typically spend very little continuous time on a single activity and many users experience frequent interruptions to their workflow. By achieving activity centric computing by enabling context switching between activities, computing systems may be able to more efficiently facilitate human activities thereby more efficiently utilizing computing resources (e.g., processing resources).

Furthermore, embodiments of the present invention improve the technology or technical field involving activity centric computing. As discussed above, activity centric computing, sometimes referred to as activity based computing, is a computing paradigm in which human activities, as opposed to applications or documents, become the central focus. For example, in activity centric computing, context switching occurs between activities (e.g., web browsing, electronic communication) as opposed to between processes or threads. In recent years, there has been an effort to achieve activity centric computing with minimal success, in part, because of the design of current operating systems. Current operating systems are designed around software system entities, such as windows, files, processes, etc. which makes it difficult to implement an activity centric computing environment. As a result, there is not currently a means for implementing a successful activity centric computing environment. Embodiments of the present invention improve such technology by implementing a successful activity centric computing environment via the use of a portable container that contains the application components, operating runtime, checkpoints and a recorded workflow session associated with an activity performed by the user on the computing device. The portable container is a lightweight, standalone, executable package of software that includes everything needed to run an application: code, operating runtime, system tools, system libraries and settings. An image of the portable container is created and stored in a repository to enable the sharing of the activity among users. By successfully implementing activity centric computing, there is an improvement in the technical field of activity centric computing.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for achieving activity centric computing, the method comprising:
    detecting an activity performed by a user on a computing device;
    capturing a runtime environment and recording a session workflow associated with said detected activity in response to detecting said activity performed by said user on said computing device, wherein said session workflow comprises a flow of events performed by said user on said computing device;
    storing said captured runtime environment and said recorded session workflow associated with said detected activity in a container;
    creating an image of said container; and
    saving said container image in a repository to be shared among users.

2. The method as recited in claim 1 further comprising:
    saving external dependencies of applications running in said container in an external dependency map.

3. The method as recited in claim 2 further comprising:
    checking said external dependencies before loading said container image in a computing environment.

4. The method as recited in claim 1, wherein said session workflow is marked by multiple checkpoints set by said user during a session, wherein said captured runtime environment comprises an application operating runtime with required application components.

5. The method as recited in claim 1, wherein a different user performs a further event in response to replaying said session workflow which is recorded in said container image.

6. The method as recited in claim 5 further comprising:
    saving said container image with said recorded further event in said repository to be shared among users.

7. The method as recited in claim 1, wherein said activity comprises one of the following:
    application usage, web browsing, printing and electronic communication.

8. A computer program product for achieving activity centric computing, the computer program product comprising one or more computer readable storage mediums having program code embodied therewith, the program code comprising programming instructions for:
    detecting an activity performed by a user on a computing device;
    capturing a runtime environment and recording a session workflow associated with said detected activity in response to detecting said activity performed by said user on said computing device, wherein said session workflow comprises a flow of events performed by said user on said computing device;
    storing said captured runtime environment and said recorded session workflow associated with said detected activity in a container;
    creating an image of said container; and
    saving said container image in a repository to be shared among users.

9. The computer program product as recited in claim 8, wherein the program code further comprises the programming instructions for:
    saving external dependencies of applications running in said container in an external dependency map.

10. The computer program product as recited in claim 9, wherein the program code further comprises the programming instructions for:
    checking said external dependencies before loading said container image in a computing environment.

11. The computer program product as recited in claim 8, wherein said session workflow is marked by multiple checkpoints set by said user during a session, wherein said captured runtime environment comprises an application operating runtime with required application components.

12. The computer program product as recited in claim 8, wherein a different user performs a further event in response to replaying said session workflow which is recorded in said container image.

13. The computer program product as recited in claim 12, wherein the program code further comprises the programming instructions for:
    saving said container image with said recorded further event in said repository to be shared among users.

14. The computer program product as recited in claim 8, wherein said activity comprises one of the following: application usage, web browsing, printing and electronic communication.

15. A system, comprising:
    a memory for storing a computer program for achieving activity centric computing; and
    a processor connected to said memory, wherein said processor is configured to execute program instructions of the computer program comprising:
        detecting an activity performed by a user on a computing device;
        capturing a runtime environment and recording a session workflow associated with said detected activity in response to detecting said activity performed by said user on said computing device, wherein said session workflow comprises a flow of events performed by said user on said computing device;
        storing said captured runtime environment and said recorded session workflow associated with said detected activity in a container;
        creating an image of said container; and
        saving said container image in a repository to be shared among users.

16. The system as recited in claim 15, wherein the program instructions of the computer program further comprise:
    saving external dependencies of applications running in said container in an external dependency map.

17. The system as recited in claim 16, wherein the program instructions of the computer program further comprise:
    checking said external dependencies before loading said container image in a computing environment.

18. The system as recited in claim 15, wherein said session workflow is marked by multiple checkpoints set by said user during a session, wherein said captured runtime environment comprises an application operating runtime with required application components.

19. The system as recited in claim 15, wherein a different user performs a further event in response to replaying said session workflow which is recorded in said container image.

20. The system as recited in claim 19, wherein the program instructions of the computer program further comprise:

saving said container image with said recorded further event in said repository to be shared among users.

* * * * *